STABILIZATION OF TRANS-DIETHYL-STILBESTROL

3,808,338

Nelson H. Ludwig, Greenfield, and William A. White, Fountaintown, Ind., assignors to Eli Lilly and Company, Indianapolis, Ind.
No Drawing. Continuation-in-part of abandoned application Ser. No. 105,942, Jan. 12, 1971. This application Aug. 26, 1971, Ser. No. 175,347
Int. Cl. A61k 17/00, 27/00
U.S. Cl. 424—346      13 Claims

ABSTRACT OF THE DISCLOSURE

Diethylstilbestrol contained in animal feed formulations is prevented from isomerizing from the active trans form to the inactive cis form by adding to the formulation an isomerization-inhibiting mixture comprising a base and a compound chosen from a defined class of aldehydes, ketones, and aldehydric reducing sugars.

CROSS REFERENCE

This application is a continuation-in-part of our copending application Ser. No. 105,942, filed Jan. 12, 1971, now abandoned.

BACKGROUND OF THE INVENTION

Diethylstilbestrol, $\alpha,\alpha'$-diethyl-4,4'-stilbenediol (DES), is a well-known growth-promoting chemical which has been commonly employed for years as a feed additive for animals which are being fattened. A great number of articles which describe the effects of diethylstilbestrol have been published. For examples of early articles disclosing the growth-promoting effects of DES, see Burroughs et al., Science 120: 66–7, July 9, 1954, and Hale et al., J. Anim. Sci. 14: 909–18, 1955.

Diethylstilbestrol can exist in two isomeric forms, cis and trans.

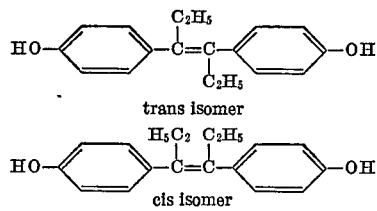

Only the trans isomer form has significant biological activity in promoting growth. Dodds, Biochemical Contributions to Endocrinology, Experiments in Hormonal Research, p. 34, Stanford Univ. Press, Stanford, Calif., 1957, reported that the cis isomer of diethylstilbestrol has only one-twentieth of the estrogenic activity of the trans isomer.

Raun, Cooley, and Smith, Comparative Efficacy of the Trans and Cis Isomers of DES in Ruminants, presented at the Am. Soc. of Animal Science annual meeting August 1970, compared the two somers of diethylstilbestrol in lamb nitrogen balance studies and in cattle and sheep feeding studies. Feeds were formulated with diethylstilbestrol containing either a high fraction of cis isomer or a high fraction of trans isomer.

Nitrogen retention in lambs fed 2 mg. per day of 64 percent cis-DES was not increased over controls, while 2 mg. per day of 97 percent trans-DES increased retention by 39 percent. One mg. per day of 75 percent cis-DES did not increase gain in fattening lambs, while 1 mg. of 99 percent trans-DES per day increased gain by 13 percent. Steers fed 10 mg. per day of 89 percent cis-DES gained weight 6 percent faster than the control; steers fed 10 mg. per day of 99 percent trans-DES increased their gain by 15 percent. It was stated that the data reported in this paper statistically significantly showed that the cis isomer of DES is less estrogenic and less efficacious in promoting growth than is the trans isomer.

Merck Index, 7th ed., p. 354 (1969), has promulgated the idea that diethylstilbestrol exists only as the trans isomer. However, in fact, the trans isomer tends to isomerize to an equilibrium mixture of cis and trans isomers.

Diethylstilbestrol is effective in animals as a growth promoter when administered in any of several ways. The most common way to treat animals with diethylstilbestrol is by administering the compound to them in their diet.

Since a steer consumes about 20 pounds per day of feed, and the dose of diethylstilbestrol to be administered per day is only 10 to 20 mg., it is quite difficult to mix the diethylstilbestrol into the feed in the proper proportions. Therefore, diethylstilbestrol, and indeed almost every drug which is administered in animal feed, is first made into a premix. An animal feed premix consists of an inert liquid solvent in which the active drug is dissolved, or an inert dry carrier on which the active drug is dispersed.

In order to make a homogeneous dry DES premix, the DES should be dissolved and sprayed onto the dry carrier. The solvents which can be used in the manufacture of DES premixes are limited, by cost and the requirement of edibility, to such liquids as ethanol, propanol, propylene glycol, polyethylene glycol, corn oil, peanut oil, and the like. The same group of solvents are used as the carriers in liquid DES premixes.

The isomerization of trans-DES to cis-DES occurs very rapidly under some conditions. For example, the following table shows the increase in the fraction of DES present which is in the cis form in a polyethylene glycol solution of initially pure trans-DES.

TABLE I

| Time (minutes) | Percent cis ° C. of— | | |
|---|---|---|---|
| | 60 | 80 | 100 |
| 15 | 2 | 15 | 24 |
| 30 | 4 | 19 | 25 |
| 60 | 7 | 23 | 25 |
| 120 | 14 | 24 | 25 |

It should be kept in mind that, although the temperatures of this test are quite high, the times of storage are very short. The extensive isomerization which is shown to occur at 100° C. in 15 minutes might occur in a feed premix in normal storage over a period of several weeks.

The 100° C. test which is shown above reached an equilibrium cis-DES content of about 25 percent in only 15 minutes. Samples of unstabilized DES-containing formulations will eventually equilibrate at a cis isomer content usually around 22 to 25 percent. Therefore, in the absence of an isomerization inhibitor, only about 77 percent of the diethylstilbestrol which was added to the formulation will be effective in promoting the growth of the cattle which consumed the feed formulation.

SUMMARY

We have now discovered that diethylstilbestrol, which isomerizes from the active trans form to the inactive cis form when contained in animal feed formulations, can be inhibited from isomerizing. An inhibiting mixture comprising a compound chosen from a defined class of aldehydes, ketones, and aldehydic reducing sugars, and a base, inhibits the isomerization of trans-diethylstilbestrol.

DESCRIPTION OF THE PREFERRED EMBODIMENT

Our method of inhibiting the isomerization of trans-diethylstilbestrol to the inactive cis form comprises adding to an animal feed or feed premix containing trans-diethylstilbestrol an effective amount of a mixture comprising (I) A first component chosen from the class consisting of (A) an aldehyde or ketone having one of the formulae

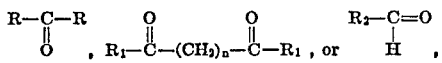

wherein each R independently represents
(1) carboxy,
(2) $C_1$–$C_{12}$ alkyl,
(3) $C_2$–$C_6$ carboxyalkyl,
(4) $C_1$–$C_3$ haloalkyl,
(5) $C_2$–$C_6$ alkenyl,
(6) benzyl, optionally substituted with
    (a) α-halo,
(7) phenyl, optionally substitued with
    (a) $C_1$–$C_3$ alkyl,
    (b) $C_2$–$C_4$ alkenyl, or
    (c) nitro, or
(8) dihydropyran, optionally substituted with
    (a) $C_1$–$C_3$ alkyl, or
    (b) keto oxygen;
both R's taken together with the carbon atom to which they are attached form
(1) $C_3$–$C_{15}$ cycloalkyl,
(2) indane,
(3) tetrahydropyran, optionally substituted with
    (a) $C_1$–$C_3$ alkyl,
(4) dihydropyran, optionally substituted with
    (a) $C_1$–$C_3$ alkyl, or
    (b) $C_1$–$C_4$ alkanoyl, or
(5) cycloheptatriene, optionally substituted with
    (a) hydroxy;
$n$ is 0 to 2;
each $R_1$ independently represents
(1) hydrogen,
(2) $C_1$–$C_3$ alkyl, or
(3) phenyl;
or both $R_1$'s taken together with the carbon atoms to which they are attached form
(1) indane,
(2) $C_3$–$C_{10}$ cycloalkyl, optionally substituted with
    (a) $C_1$–$C_3$ alkyl, or
(3) dihydropyran, optionally substituted with
    (a) $C_1$–$C_3$ alkyl or
    (b) $C_1$–$C_4$ alkanoyl;
$R_2$ represents
(1) $C_1$–$C_4$ alkanoyl,
(2) $C_6$–$C_{12}$ alkyl,
(3) $C_6$–$C_{12}$ alkenyl,
(4) phenyl, optionally substituted with
    (a) hydroxy,
    (b) nitro, or
    (c) $C_1$–$C_3$ alkoxy, or
(5) tetrahydrofuran, optionally substituted with
    (a) $C_1$–$C_3$ alkyl;
or
(B) an aldehydic reducing sugar containing 5–12 carbon atoms; and (II) a second component selected from the class of bases consisting of
(A) an amine having one of the formulae

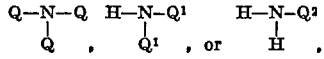

wherein each Q independently represents
(1) hydrogen,
(2) allyl,
(3) propargyl,
(4) $C_1$–$C_3$ alkyl, optionally substituted with
    (a) hydroxy, or
(5) benzyl, optionally substituted with
    (a) $C_1$–$C_3$ alkyl,
    (b) $C_1$–$C_3$ alkoxy, or
    (c) hydroxy;
each $Q^1$ independently represents
(1) $C_4$–$C_8$ alkyl,
(2) $C_4$–$C_8$ alkenyl,
(3) $C_4$–$C_8$ alkynyl,
(4) $C_3$–$C_8$ cycloalkyl, or
(5) $C_4$–$C_7$ cycloalkylalkyl, each of which may be optionally substituted with
    (a) hydroxy;
or both $Q^1$'s taken together with the nitrogen atom to which they are attached represent
(1) pyrrolidinyl,
(2) piperidinyl, or
(3) morpholinyl;
$Q^2$ represents
(1) $C_9$–$C_{18}$ alkyl,
(2) $C_9$–$C_{18}$ alkenyl, or
(3) $C_9$–$C_{18}$ alkynyl, each of which may be optionally substituted with
    (a) hydroxy;
(4) $C_7$–$C_9$ phenylalkyl,
(5) $C_9$–$C_{15}$ cycloalkyl, or
(6) $C_8$–$C_{15}$ cycloalkylalkyl, each of which may be optionally ring-substituted with
    (a) hydroxy,
    (b) $C_1$–$C_3$ alkyl, or
    (c) $C_1$–$C_3$ alkoxy;

(B) a diamine having the formula

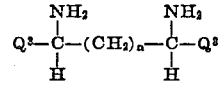

wherein $n$ represents 0 to 4;
each $Q^3$ independently represents
(1) hydrogen, or
(2) $C_1$–$C_3$, optionally substituted with
    (a) hydroxy;

(C) a quaternary salt having the formula

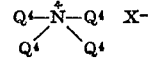

wherein each $Q^4$ independently represents
(1) hydrogen, or
(2) $C_1$–$C_3$ alkyl,
and X represents
(1) hydroxy,
(2) ½$CO_3^=$, or
(3) acetate;

(D) lecithin;
(E) an alkali metal hydroxide;
(F) calcium hydroxide;
(G) magnesium hydroxide; or
(H) an alkali metal salt of an acid chosen from the group consisting of formic acid, benzoic acid, acetic acid, ethylenediamine tetraacetic acid, nitrilotriacetic acid, propionic acid, citric acid, butyric acid, and carbonic acid.

In the above descriptions, the various alkyl, alkenyl, alkynyl, and alkoxy groups refer to substituents such as methyl, ethyl, isopropyl, methoxy, propoxy, butyl, pentyl, isooctyl, crotyl, 2-pentenyl, 3,6-octadienyl, 3-pentynyl, 4-hexynyl, 2-heptynyl, decyl, dodecyl, hexadecyl, 2,6-nonadienyl, 6-dodecenyl, 8-hexadecynyl, 5-decynyl, 4-tetradecynyl, 6-octadecynyl, vinyl, and 1,3,5-heptatrienyl.

The various cycloalkyl and cycloalkylalkyl groups which are used in the above descriptions are intended to include substituents such as cyclopropyl, cyclohexyl, cyclodecyl, cyclododecyl, cyclopropylmethyl, cyclobutylethyl, and dicyclopropylmethyl, and includes polynuclear cycloalkyls such as

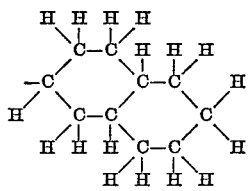

and

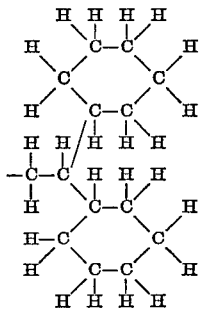

$C_1$–$C_4$ alkanoyl refers to substituents such as formyl, acetyl, and propionyl.

$C_2$–$C_6$ carboxyalkyl refers to substituents such as carboxymethyl, carboxypropyl, 1,1-dimethylcarboxyethyl, and carboxybutyl.

Halo refers to fluorine, chlorine, bromine, and iodine.

$C_1$–$C_3$ haloalkyl refers to substituents such as trifluoromethyl, bromoethyl, and 2,3-dichloropropyl.

$C_1$–$C_3$ alkoxy refers to substituents such as methoxy, ethoxy, and isopropoxy.

Aldehydic reducing sugars refers to carbohydrate sugar molecules which consist of from five to twelve carbon atoms, all of which are connected by single bonds, and which contain an eldhyde group, which are typified by glucose, xylose, lactose, allose, galactose, ribose, and arabinose.

Alkali metal refers to sodium, lithium, and potassium While the alkali metal hydroxides are operable in inhibiting the isomerization of DES, there are disadvantages in their use. Alkali metal hydroxides are, as is well-known, caustic and toxic chemicals. The amounts of them which can be tolerated by animals is strictly limited as is well-known in the animal husbandry art. Further, the alkali metal hydroxides under many conditions of storage can contribute to instability of DES. That is, while the isomerization of DES from the trans to the cis form will be inhibited, DES is easily oxidized at high pH. Still further, central nervous system damage has occurred to animals fed substantial amounts of lithium compounds. Therefore, while the alkali metal hydroxides are operable in our method, they should be used only with caution.

The components of the inhibiting mixture should be present in amounts based on the quantity of trans-DES. The first component, as described above, should be present in the formulation at a level from about 10 percent to about 100 percent by weight of the trans-DES level; the second component, as defined above, should be present at from about 10 percent to about 100 percent by weight of the level of the first component.

Examples of compounds which are typical of the first-component compounds of our isomerization-inhibiting mixture are listed below. The listing is not exhaustive, but contains only compounds the character of which will enable others skilled in the art to choose further effective compounds which are within the scope of our invention.

Acetone
4-acetylbutyric acid
Benzil
α-Bromoacetophenone
α-Bromo-α-phenylacetophenone
Citral
Citronellal
Cyclododecanone
1,3-cyclohexanedione
Cyclohexanone
Cyclopentanone
Dehydroacetic acid
Desoxybenzoin
Diacetyl
5,5-dimethyl-1,3-cyclohexanedione
Furfural
Glucose
1,3-indanedione
2-indanone
α-Ionone
Lactose
Levulinic acid
Mesityl oxide
Methyl ethyl ketone
p-Nitroacetophenone
p-Nitrobenzaldehyde
Nonylaldehyde
3-pentanone
Pulegone
Pyruvic aldehyde
Tropolone
2-undecanone
Vanillin
Xylose Examples of the second-component compounds of our mixture are listed below.

Ammonia,
Ammonium hydroxide,
Ethanolamine,
Propanolamine,
Isopropanolamine,
Methylamine,
Butylamine,
n-Amylamine,
Triallylamine,
Tripropargylamine,
Tribenzylamine,
Tri[(4-ethyl)benzyl]amine,
Tri[(3-hydroxy)benzyl]amine,
Tri[(4-propoxy)benzyl]amine,
Dihexylamine,
Di(4-octenyl)amine,
Di(3-pentynyl)amine,
Dicyclooctylamine,
Dicyclobutylamine,
Dicyclopropylamine,
Di(cyclopropyl)methylamine,
Di[(8-hydroxy)octyl]amine,
Di[(4-hydroxy)crotyl]amine,
Di[(2-hydroxy)-3-heptynyl]amine,
Di[(3-hydroxy)cyclopropyl]amine,
Di[(4-hydroxy)cyclohexyl]amine,
Di[(2-hydroxy)cyclohexyl]methylamine,
Nonylamine,
Dodecylamine,
5-hydroxy-6-dodecynylamine,
Phenethylamine,
2-decahydronaphthylamine,
2,2-di(cyclohexyl)ethylamine,
Di[(3-methoxy)cyclohexyl[amine,
Pyrrolidine,
Piperidine,
Morpholine,
Ethylenediamine,
2,4-pentanediamine,
1,8-dihydroxy-3,6-octanediamine,
Tetramethylammonium carbonate,
Tetrapropyammonium hydroxide,
Lecithin, Trimethylamine,
Triethanolamine,
2-hexadecylamine,
4-heptadecynylamine,
4-hydroxytetradecylamine,
5-hydroxy-6-heptadecenylamine,
4-methoxybenzylamine,

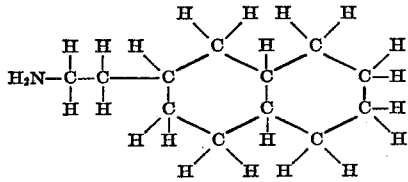

Ammonium hydroxide,
Potassium formate,
Tetrasodium salt of ethylenediaminetetraacetic acid,
Trisodium salt of nitrilotriacetic acid,
Sodium acetate,
Potassium propionate,
Sodium citrate,
Sodium bicarbonate,
Potassium carbonate,
Sodium borate,
Sodium silicate,
Dipotassium phosphate,
Lithium acetate,
Lithium propionate,
Sodium hydroxide,
Potassium hydroxide,
Lithium hydroxide,
Calcium hydroxide,
Magnesium hydroxide,
Sodium silicate,
Potassium silicate,
Dilithium phosphate.

When a first-component compound which is within the scope of our invention, but not individually listed herein, is to be used in our method, it is necessary to decide which basic second component to use with it. That choice can easily be made by routine use of the following test method.

One-half gram of the inhibiting compound is added to 50 ml. of propylene glycol at 65–70° C. and stirred until the solution is clear. One-half gram of the base is then added, and the solution stirred. Then 2½ gm. of trans-DES is added with stirring, without excluding air and light. The solution is held for 16 hours at 65–70° C., and then analyzed for cis- and trans-DES by our analytical method.

A small sample containing the DES is allowed to react with bis-trimethylsilyl acetamide (BSA) for about 20 minutes, and the bis-trimethylsilyl ether derivative is taken up in chloroform. The chloroform solution is then injected into an F and M–402 gas-liquid chromatography column containing 5 percent XE60 (silicone gum nitrile supplied by Applied Science Labs, P.O. Box 140, State College, Pa.) and the chromatogram run at a temperature of about 185° C. The ratio of cis and trans isomers is determined by calculating the area under the respective isomer peaks on the recorded printout. In the case of liquid preparations, three drops of the sample are reacted with one-half ml. of BSA for about 20 minutes. The reaction solution is then diluted with chloroform to a volume of 5 ml. and the diluted solution is injected into the chromatograph. In the case of solid preparations, one gram of the formulation is allowed to react with excess BSA and the bis-trimethylsilyl ethers of the respective isomers of diethylstilbestrol are extracted with chloroform for injection into the chromatograph.

The quantity of DES in a feed or feed premix is described in the art in terms of grams/ton or grams/pound. This mixed system of units will be used in the specification.

Liquid feed premixes for animal feed manufacture comprise solutions, in edible organic solvents, which contain from about 10 to about 40 grams of DES per pound of solution. The concentration is fixed by the solubility of DES in the available solvents, and by the necessity to provide a concentration which is convenient in use for manufacturing the final feeds, using the premix as a raw material.

It is to be understood that the concentrations named in this specification are those presently in use in the art. The effectiveness of our method is not limited to a certain range of concentrations of trans-DES, but is broadly applicable to feed premix and animal feed formulations of trans-DES.

A number of examples of effectively stabilized animal feed liquid premixes of trans-DES are listed below. These examples are representative of liquid premixes which are practical and usable in the art, and are not intended to demonstrate the outer reaches of the useful range of our method. The exemplary liquid premixes are also typical of the solutions used for manufacture of dry premixes.

All the exemplary liquid premixes can be manufactured by the following process, which is usable in present manufacturing plants.

1. Warm the solvent to 50° C.
2. Add the isomerization-inhibiting compounds, and stir.
3. Add the trans-DES and stir.
4. Allow the solution to cool.

EXAMPLE 1.—20 gm./lb. liquid premix

| | Gm. |
|---|---|
| Propylene glycol | 424 |
| Acetone | 5 |
| Ethanolamine | 5 |
| trans-Diethylstilbestrol | 20 |

EXAMPLE 2.—40 gm./lb. liquid premix

| | Gm. |
|---|---|
| Polyethylene glycol 400 | 394 |
| 4-acetylbutyric acid | 12 |
| Ethanolamine | 8 |
| trans-Diethylstilbestrol | 40 |

EXAMPLE 3.—20 gm./lb. liquid premix

| | Gm. |
|---|---|
| Polyethylene glycol 600 | 418 |
| α-Bromo-α-phenylacetophenone | 10 |
| Ammonium hydroxide | 6 |
| trans-Diethylstilbestrol | 20 |

EXAMPLE 4.—30 gm./lb. liquid premix

| | Gm. |
|---|---|
| Propylene glycol | 409 |
| Citronellal | 8 |
| Ethanolamine | 7 |
| trans-Diethylstilbestrol | 30 |

EXAMPLE 5.—20 gm./lb. liquid premix

| | Gm. |
|---|---|
| Propylene glycol | 414 |
| 1,3-cyclohexanedione | 10 |
| Ammonium hydroxide | 10 |
| trans-Diethylstilbestrol | 20 |

EXAMPLE 6.—40 gm./lb. liquid premix

| | Gm. |
|---|---|
| Propylene glycol 200 | 404 |
| Cyclopentanone | 5 |
| Propanolamine | 5 |
| trans-Diethylstilbestrol | 40 |

EXAMPLE 7.—20 gm./lb. liquid premix

|   | Gm. |
|---|---|
| Polyethylene glycol 600 | 404 |
| Desoxybenzoin | 20 |
| Ethanolamine | 10 |
| trans-Diethylstilbestrol | 20 |

EXAMPLE 8.—30 gm./lb. liquid premix

|   | Gm. |
|---|---|
| Propylene glycol | 404 |
| 5,5-dimethyl-1,3-cyclohexanedione | 10 |
| Ammonium hydroxide | 10 |
| trans-Diethylsilbestrol | 30 |

EXAMPLE 9.—20 gm./lb. liquid premix

|   | Gm. |
|---|---|
| Propylene glycol | 420 |
| Glucose | 8 |
| Ethanolamine | 6 |
| trans-Diethylstilbestrol | 20 |

EXAMPLE 10.—20 gm./lb. liquid premix

|   | Gm. |
|---|---|
| Propylene glycol | 408 |
| 2-indanone | 14 |
| Ethanolamine | 12 |
| trans-Diethylstilbestrol | 20 |

EXAMPLE 11.—40 gm./lb. liquid premix

|   | Gm. |
|---|---|
| Polyethylene glycol 200 | 379 |
| Lactose | 20 |
| Ethanolamine | 15 |
| trans-Diethylstilbestrol | 40 |

EXAMPLE 12.—20 gm./lb. liquid premix

|   | Gm. |
|---|---|
| Polyethylene glycol 600 | 411 |
| Mesityl oxide | 15 |
| Propanolamine | 8 |
| trans-Diethylstilbestrol | 20 |

EXAMPLE 13.—40 gm./lb. liquid premix

|   | Gm. |
|---|---|
| Polyethylene glycol 400 | 369 |
| p-Nitrobenzaldehyde | 30 |
| Ammonium hydroxide | 15 |
| trans-Diethylstilbestrol | 40 |

EXAMPLE 14.—20 gm./lb. liquid premix

|   | Gm. |
|---|---|
| Propylene glycol | 394 |
| 3-pentanone | 20 |
| Ethanolamine | 20 |
| trans-Diethylstilbestrol | 20 |

EXAMPLE 15.—30 gm./lb. liquid premix

|   | Gm. |
|---|---|
| Polyethylene glycol 200 | 409 |
| Pyruvic aldehyde | 10 |
| Ammonium hydroxide | 5 |
| trans-Diethylstilbestrol | 30 |

EXAMPLE 16.—40 gm./lb. liquid premix

|   | Gm. |
|---|---|
| Polyethylene glycol 600 | 394 |
| 2-undecanone | 10 |
| Ethanolamine | 10 |
| trans-Diethylstilbestrol | 40 |

EXAMPLE 17.—20 gm./lb. liquid premix

|   | Gm. |
|---|---|
| Propylene glycol | 424 |
| Xylose | 5 |
| Ethanolamine | 5 |
| trans-Diethylstilbestrol | 20 |

EXAMPLE 18.—40 gm./lb. liquid premix

|   | Gm. |
|---|---|
| Polyethylene glycol 200 | 384 |
| Furfural | 20 |
| Magnesium hydroxide | 10 |
| trans-Diethylstilbestrol | 40 |

EXAMPLE 19.—30 gm./lb. liquid premix

|   | Gm. |
|---|---|
| Propylene glycol | 414 |
| Citral | 5 |
| Dicyclopropylamine | 5 |
| trans-Diethylstilbestrol | 30 |

EXAMPLE 20.—30 gm./lb. liquid premix

|   | Gm. |
|---|---|
| Propylene glycol | 399 |
| Lactose | 20 |
| Calcium acetate | 5 |
| trans-Diethylstilbestrol | 30 |

EXAMPLE 21.—20 gm./lb. liquid premix

|   | Gm. |
|---|---|
| Polyethylene glycol 400 | 409 |
| Tropolone | 20 |
| Phenethylamine | 5 |
| trans-Diethylstilbestrol | 20 |

EXAMPLE 22.—30 gm./lb. liquid premix

|   | Gm. |
|---|---|
| Propylene glycol | 409 |
| Xylose | 8 |
| 2,4-pentanediamine | 7 |
| trans-Diethylstilbestrol | 30 |

EXAMPLE 23.—40 gm./lb. liquid premix

|   | Gm. |
|---|---|
| Propylene glycol | 389 |
| Diacetyl | 15 |
| 2-decahydronaphthylamine | 10 |
| trans-Diethylstilbestrol | 40 |

EXAMPLE 24.—25 gm./lb. liquid premix

|   | Gm. |
|---|---|
| Polyethylene glycol 200 | 409 |
| Nonylaldehyde | 10 |
| Nonylamine | 10 |
| trans-Diethylstilbestrol | 25 |

EXAMPLE 25.—30 gm./lb. liquid premix

|   | Gm. |
|---|---|
| Propylene glycol | 401 |
| Citronellal | 15 |
| Lecithin | 8 |
| trans-Diethylstilbestrol | 30 |

EXAMPLE 26.—20 gm./lb. liquid premix

|   | Gm. |
|---|---|
| Polyethylene glycol 400 | 426 |
| Mesityl oxide | 5 |
| Choline | 3 |
| trans-Diethylstilbestrol | 20 |

EXAMPLE 27.—40 gm./lb. liquid premix

|   | Gm. |
|---|---|
| Propylene glycol | 384 |
| Arabinose | 20 |
| Di(cyclopropyl)ethylamine | 10 |
| trans-Diethylstilbestrol | 40 |

EXAMPLE 28.—30 gm./lb. liquid premix

|   | Gm. |
|---|---|
| Propylene glycol | 411 |
| 2-indanone | 8 |
| Potassium silicate | 5 |
| trans-Diethylstilbestrol | 30 |

Dry premixes are also widely used as means for mixing a small amount of trans-DES with an animal feed formulation. A normal dry premix is manufactured by homogeneously combining a solution such as the above Examples 1–28 with an amount of a dry edible carrier which will absorb the liquid without becoming soggy. Suitable dry carriers can be nearly any of the ingredients of animal feed such as alfalfa granules, soybean meal, rice hulls, cracked corn, and almost any other nutritive or at least nonharmful carrier, including diatomaceous earth granules and exfoliated hydrobiotite.

Dry premixes are formulated to contain from about one to about ten grams of DES per pound of premix.

The preferred dry premixes which incorporate the DES-stabilizing method of this invention are prepared by making a solution such as has just been described and then mixing the solution with the dry edible carrier in a mixer such as is well known in the animal feed art. Such a dry premix formulation would contain, for example, five grams of trans-DES, one gram of a first-component compound, and one gram of a second-component compound per pound of premix.

It will be understood by those skilled in the art that considerable variations in the ratio between the concentration of DES and the concentration of inhibitor are possible in that, in individual cases, ratios which are different from the ratios here named will be effective. The exact amount of inhibitor which will be required in a given feed formulation will depend, among other factors, upon the choice of inhibitors to be used and upon the length of time that the premix will be in storage.

The following examples of dry premixes, inhibited from isomerization by our method, can all be manufactured by the following process.

1. Make an isomerization-inhibited trans-DES solution by the process outlined preceding Example 1.
2. Apply the solution to the dry carrier in a suitable mixer.

EXAMPLE 29.—2 gm./lb. dry premix

|  | Gm. |
|---|---|
| Alfalfa granules | 431 |
| Liquid premix of Ex. 2 | 23 |

EXAMPLE 30.—2 gm./lb. dry premix

|  | Gm. |
|---|---|
| Soybean meal | 409 |
| Liquid premix of Ex. 1 | 45 |

EXAMPLE 31.—10 gm./lb. dry premix

|  | Gm. |
|---|---|
| Alfalfa granules | 340 |
| Liquid premix of Ex. 6 | 114 |

EXAMPLE 32.—5 gm./lb. dry premix

|  | Gm. |
|---|---|
| Alfalfa granules | 378 |
| Liquid premix of Ex. 4 | 76 |

EXAMPLE 33.—2 gm./lb. dry premix

|  | Gm. |
|---|---|
| Diatomaceous earth granules | 409 |
| Liquid premix of Ex. 7 | 45 |

EXAMPLE 34.—2 gm./lb. dry premix

|  | Gm. |
|---|---|
| Alfalfa granules | 424 |
| Liquid premix of Ex. 8 | 30 |

EXAMPLE 35.—2 gm./lb. dry premix

|  | Gm. |
|---|---|
| Alfalfa granules | 431 |
| Liquid premix of Ex. 11 | 23 |

EXAMPLE 36.—2 gm./lb. dry premix

|  | Gm. |
|---|---|
| Soybean meal | 431 |
| Liquid premix of Ex. 13 | 23 |

EXAMPLE 37.—5 gm./lb. dry premix

|  | Gm. |
|---|---|
| Alfalfa granules | 378 |
| Liquid premix of Ex. 15 | 76 |

EXAMPLE 38.—10 gm./lb. dry premix

|  | Gm. |
|---|---|
| Diatomaceous earth granules | 340 |
| Liquid premix of Ex. 16 | 114 |

EXAMPLE 39.—2 gm./lb. dry premix

|  | Gm. |
|---|---|
| Alfalfa granules | 409 |
| Liquid premix of Ex. 17 | 45 |

DES is often combined with other growth-promoting or medicinal compounds in animal feeds and feed premixes. DES and methyl testosterone is a particularly useful combination, which is highly effective in fattening hogs. Those skilled in the art will recognize that our method of inhibition of isomerization of trans-DES is operable in premixes and feeds containing multiple active ingredients.

Typical DES-treated feeds contain only from about one to about two grams of DES per ton of feed. Thus, very small amounts of premixes containing from about one to about 40 gm. of DES per pound, are added to each ton of feed.

The premix is combined with the feed in one of several ways. The feed, spread out in bunks, may be top-dressed with the premix. A dry premix may be dry-mixed into the feed, preferably first making a secondary premix by mixing the premix into about 20 lb. of feed from each one-ton batch. A liquid premix may be dissolved in a liquid component of the feed and applied to the solid components.

Exemplary isomerization-inhibited DES-containing animal feeds follow. It is needless to multiply examples of feeds too far, since the formulation of feed is only a matter of arithmetic. The manufacturer need only know the DES content of his premix and the desired DES content of the feed, and compute the needed amount of premix per batch of feed. The composition of the feed and the desired content of DES have no effect on the effectiveness of our isomerization-inhibiting method.

EXAMPLE 40.—1 gm./ton feed

|  | Lb. |
|---|---|
| Balanced cattle feed | 1999.5 |
| Premix of Ex. 29 | 0.5 |

EXAMPLE 41.—2 gm./ton feed

|  | Lb. |
|---|---|
| Balanced cattle feed | 1999.8 |
| Premix of Ex. 31 | 0.2 |

EXAMPLE 42.—1½ gm./ton feed

|  | Lb. |
|---|---|
| Balanced hog feed | 1999.7 |
| Premix of Ex. 32 | 0.3 |

EXAMPLE 43.—2 gm./ton feed

|  | Lb. |
|---|---|
| Cattle feed | 1899.9 |
| Liquid supplement | 100.0 |
| Premix of Ex. 1 | 0.1 |

EXAMPLE 44.—2 gm./ton feed

|  | Lb. |
|---|---|
| Sheep feed | 1949.95 |
| Molasses | 50.00 |
| Premix of Ex. 2 | 0.05 |

The isomerization-inhibiting method of our invention may also be used to manufacture a stabilized trans-DES concentrate to be used for manufacture of premixes. The examples which follow illustrate the type of concentrates which can be made. One of our first-component compounds and a suitable base are mixed intimately with trans-DES, and the mixture (of solid DES, base, and liquid or solid inhibitor) is put into a homogeneous physical form by suitable processing. The amount of first-component compound should be from about 10 percent to about 100 percent by weight of the amount of DES, and the amount of the base should be from about 10 percent to about 100 percent by weight of the amount of the first-component compound.

These concentrates may be conveniently shipped and stored indefinitely in a small space. When premixes are needed, it is necessary only to dissolve the concentrate in a suitable edible solvent.

EXAMPLE 45.—Stabilized DES mixture

| | Percent |
|---|---|
| trans-Diethylstilbestrol | 60 |
| Cyclohexanone | 20 |
| Ethanolamine | 20 |

Mix in a paste-type mixer and grind to a smooth slurry in a colloid mill or homogenizer.

EXAMPLE 46.—Stabilized DES mixture

| | Percent |
|---|---|
| trans-Diethylstilbestrol | 50 |
| Glucose | 25 |
| Ethanolamine | 25 |

Process as in Ex. 45 to produce a smooth slurry.

EXAMPLE 47.—Stabilized DES mixture

| | Percent |
|---|---|
| trans-Diethylstilbestrol | 40 |
| 2-indanone | 30 |
| Ammonium hydroxide | 30 |

Process as in Ex. 45 to produce a smooth slurry.

The following examples, which illustrate the effectiveness of our isomerization-inhibiting method, were tested by the test method given above.

The data are presented as the percent of the DES which was in the trans form at 16 hours. A value of about 77 percent trans-DES is the uninhibited equilibrium value; values above that represent inhibition of DES isomerization.

| First component | Second component | Analysis, percent |
|---|---|---|
| Acetone | Ethanolamine | 87 |
| Do | Ammonium hydroxide | 77 |
| 4-acetylbutyric acid | Ethanolamine | 97 |
| Do | Ammonium hydroxide | 79 |
| Do | Ethylenediamine | 93 |
| Do | Triethylamine | 77 |
| Do | Triethanolamine | 78 |
| Do | Cyclohexylamine | 88 |
| Do | 2-aminobutane | 92 |
| Do | Dodecylamine | 84 |
| Benzil | Ethanolamine | 93 |
| Do | Ammonium hydroxide | 77 |
| α-Bromoacetophenone | Ethanolamine | 99 |
| Do | Ammonium hydroxide | 99 |
| α-Bromo-α-phenylacetophenone | Ethanolamine | 99 |
| Do | Ammonium hydroxide | 97 |
| Citral | Ethanolamine | 99 |
| Do | Ammonium hydroxide | 99 |
| Do | Ethylenediamine | 99 |
| Do | Triethylamine | 95 |
| Do | Triethanolamine | 96 |
| Do | Cyclohexylamine | 99 |
| Do | 2-aminobutane | 99 |
| Do | Dodecylamine | 96 |
| Do | Lecithin | 96 |
| Citronellal | Ethanolamine | 93 |
| Do | Ammonium hydroxide | 79 |
| Cyclododecanone | Ethanolamine | 86 |
| Do | Ammonium hydroxide | 77 |
| Cyclohexanone | Ethanolamine | 96 |
| Do | Ammonium hydroxide | 84 |
| Do | Ethylenediamine | 98 |
| Do | Triethylamine | 81 |
| Do | Triethanolamine | 80 |
| Do | Cyclohexylamine | 98 |
| Do | 2-aminobutane | 98 |
| Do | Dodecylamine | 99 |
| Cyclopentanone | Ethanolamine | 99 |
| Do | Ammonium hydroxide | 89 |
| Dehydroacetic acid | Ethanolamine | 93 |
| Do | Ammonium hydroxide | 83 |
| Do | Ethylenediamine | 84 |
| Do | Triethylamine | 90 |
| Do | Triethanolamine | 92 |
| Do | Cyclohexylamine | 91 |
| Do | 2-aminobutane | 90 |
| Do | Dodecylamine | 78 |
| Desoxybenzoin | Ethanolamine | 97 |
| Do | Ammonium hydroxide | 91 |

TABLE—Continued

| First component | Second component | Analysis, percent |
|---|---|---|
| Diacetyl | Ethanolamine | 99 |
| Do | Ammonium hydroxide | 96 |
| Do | Ethylenediamine | 97 |
| Do | Triethylamine | 96 |
| Do | Triethanolamine | 78 |
| Do | Diethylamine | 99 |
| Do | Diethanolamine | 79 |
| Do | Cyclohexylamine | 79 |
| Do | Octylamine | 96 |
| Do | 2-aminobutane | 77 |
| Do | Dodecylamine | 97 |
| Do | Sodium acetate | 87 |
| Do | Disodium phosphate | 92 |
| Do | Sodium bicarbonate | 96 |
| Do | Sodium carbonate | 98 |
| Do | Calcium hydroxide | 99 |
| Do | Calcium carbonate | 77 |
| Do | Sodium borate | 77 |
| Do | Lecithin | 80 |
| 5,5-dimethyl-1,3-cyclohexanedione | Ethanolamine | 88 |
| Do | Ammonium hydroxide | 98 |
| Do | Ethylenediamine | 86 |
| Do | Triethylamine | 85 |
| Do | Triethanolamine | 78 |
| Do | Cyclohexylamine | 82 |
| Do | 2-aminobutane | 82 |
| Do | Dodecylamine | 82 |
| Furfural | Ethanolamine | 92 |
| Do | Ammonium hydroxide | 81 |
| Glucose | Ethanolamine | 98 |
| Do | Ammonium hydroxide | 77 |
| 2,5-hexanedione | Ethanolamine | 96 |
| Do | Ammonium hydroxide | 83 |
| Do | Ethylenediamine | 96 |
| Do | Triethylamine | 82 |
| Do | Triethanolamine | 78 |
| Do | Cyclohexylamine | 98 |
| Do | 2-aminobutane | 98 |
| Do | Dodecylamine | 79 |
| 1,3-indanedione | Ethanolamine | 96 |
| Do | Ammonium hydroxide | 94 |
| 2-indanone | Ethanolamine | 99 |
| Do | Ammonium hydroxide | 99 |
| α-Ionone | Ethanolamine | 98 |
| Do | Ammonium hydroxide | 99 |
| Lactose | Ethanolamine | 92 |
| Do | Ammonium hydroxide | 77 |
| Levulinic acid | Ethanolamine | 96 |
| Do | Ammonium hydroxide | 78 |
| Mesityl oxide | Ethanolamine | 90 |
| Do | Ammonium hydroxide | 82 |
| Methyl ethyl ketone | Ethanolamine | 88 |
| Do | Ammonium hydroxide | 77 |
| p-Nitrobenzaldehyde | Ethanolamine | 82 |
| Do | Ammonium hydroxide | 97 |
| Nonyl aldehyde | Ethanolamine | 98 |
| Do | Ammonium hydroxide | 97 |
| Petanone | Ethanolamine | 85 |
| Do | Ammonium hydroxide | 77 |
| Pulegone | Ethanolamine | 94 |
| Do | Ammonium hydroxide | 80 |
| Pyruvic aldehyde | Ethanolamine | 99 |
| Do | Ammonium hydroxide | 99 |
| Tropolone | Ethanolamine | 84 |
| Do | Ammonium hydroxide | 82 |
| 2-undecanone | Ethanolamine | 87 |
| Do | Ammonium hydroxide | 77 |
| Vanillin | Ethanolamine | 92 |
| Do | Ammonium hydroxide | 98 |
| Do | Ethylenediamine | 89 |
| Do | Triethylamine | 80 |
| Do | Triethanolamine | 85 |
| Do | Cyclohexylamine | 85 |
| Do | 2-aminobutane | 87 |
| Do | Dodecylamine | 91 |
| Xylose | Ethanolamine | 99 |
| Do | Ammonium hydroxide | 98 |
| Do | Ammonium acetate | 99 |
| Do | Sodium acetate | 96 |
| Do | Ammonium bicarbonate | 98 |
| Do | Sodium bicarbonate [1] | 99 |
| Do | Sodium carbonate [1] | 99 |

[1] 0.1 g. of second component was used instead of 0.5 gm.

It will be clear to those skilled in the chemical arts that the data just presented prove clearly that the isomerization-inhibiting method of our invention is highly effective. It will also be clear that the efficacy of the inhibiting compounds which are used in our examples indicates that the several broad chemical types, of which these compounds are exemplary, contain many other compounds which also are effective in our method.

We emphasize that our method of protection of trans-DES from isomerizing comprises the combination of trans-DES with at least two compounds, each of which is to be chosen from a defined class. We have proven that both classes of compounds are broad and include many active members. However, each member of the class of first-component compounds is not effective in combination with each member of the class of second-component compounds. It has been demonstrated that all members of the class of first-component compounds are effective, when combined with many suitable second-component compounds, and that all members of the class of second-component compounds are effective when combined with many suitable first-component compounds. A routine test method is provided by which the first-component and second-component compounds may be matched.

We claim:

1. A method for inhibiting the isomerization of trans-diethylstilbestrol to cis-diethylstilbestrol in animal feed compositions or premixes containing said trans-diethylstilbestrol which comprises adding to such feed compositions or premixes an isomerization-inhibiting amount of a mixture comprising (I) a first component chosen from the class consisting of (A) an aldehyde or ketone having one of the formulae $$R-\underset{\underset{O}{\|}}{C}-R,$$

$$R_1-\underset{\underset{O}{\|}}{C}-(CH_2)_n-\underset{\underset{O}{\|}}{C}-R_1, \text{ or}$$

$$R_2-\underset{\underset{H}{\|}}{C}=O,$$

wherein each R independently represents
 (1) carboxy,
 (2) $C_1-C_{12}$ alkyl,
 (3) $C_2-C_6$ carboxyalkyl,
 (4) $C_1-C_3$ haloalkyl,
 (5) $C_2-C_6$ alkenyl,
 (6) benzyl, optionally substituted with
  (a) α-halo
 (7) phenyl, optionally substituted with
  (a) $C_1-C_3$ alkyl,
  (b) $C_2-C_4$ alkenyl, or
  (c) nitro, or
 (8) dihydropyran, optionally substituted with
  (a) $C_1-C_3$ alkyl, or
  (b) keto oxygen;
or both R's taken together with the carbon atom to which they are attached form
 (1) $C_3-C_{15}$ cycloalkyl,
 (2) indane,
 (3) tetrahydropyran, optionally substituted with
  (a) $C_1-C_3$ alkyl,
 (4) dihydropyran, optionally substituted with
  (a) $C_1-C_3$ alkyl, or
  (b) $C_1-C_4$ alkanoyl, or
 (5) cycloheptatriene, optionally substituted with
  (a) hydroxy;
$n$ is 0 to 2; each $R_1$ independently represents
 (1) hydrogen,
 (2) $C_1-C_3$ alkyl, or
 (3) phenyl;
or both $R_1$'s taken together with the carbon atoms to which are attached form
 (1) indane,
 (2) $C_3-C_{10}$ cycloalkyl, optionally substituted with
  (a) $C_1-C_3$ alkyl, or
 (3) dihydropyran, optionally substituted with
  (a) $C_1-C_3$ alkyl or
  (b) $C_1-C_4$ alkanoyl;
$R_2$ represents
 (1) $C_1-C_4$ alkanoyl,
 (2) $C_6-C_{12}$ alkyl,
 (3) $C_6-C_{12}$ alkenyl,
 (4) phenyl, optionally substituted with
  (a) hydroxy,
  (b) nitro, or
  (c) $C_1-C_3$ alkoxy, or
 (5) tetrahydrofuran, optionally substituted with
  (a) $C_1-C_3$ alkyl;

or (B) an aldehydic reducing sugar containing 5–12 carbon atoms; and (II) a second component selected from the class of bases consisting of (A) an amine having one of the formulae $$\underset{\underset{Q}{\|}}{Q-N-Q}, \quad \underset{\underset{Q^1}{\|}}{H-N-Q^1}, \quad \text{or} \quad \underset{\underset{H}{\|}}{H-N-Q^2},$$

wherein each Q independently represents
 (1) hydrogen,
 (2) allyl,
 (3) propargyl,
 (4) $C_1-C_3$ alkyl, optionally substituted with
  (a) hydroxy, or
 (5) benzyl, optionally substituted with
  (a) $C_1-C_3$ alkyl,
  (b) $C_1-C_3$ alkoxy, or
  (c) hydroxy;
each $Q^1$ independently represents
 (1) $C_4-C_8$ alkyl,
 (2) $C_4-C_8$ alkenyl,
 (3) $C_4-C_8$ alkynyl,
 (4) $C_3-C_8$ cycloalkyl, or
 (5) $C_4-C_7$ cycloalkylalkyl,
  each of which may be optionally substituted with
  (a) hydroxy;
or both $Q^1$'s taken together with the nitrogen atom to which they are attached represent
 (1) pyrrolidinyl,
 (2) piperidnyl, or
 (3) morpholinyl;
$Q^2$ represents
 (1) $C_9-C_{18}$ alkyl,
 (2) $C_9-C_{18}$ alkenyl, or
 (3) $C_9-C_{18}$ alkynyl,
 each of which may be optionally substituted with
  (a) hydroxy;
 (4) $C_7-C_9$ phenylalkyl,
 (5) $C_9-C_{15}$ cycloalkyl, or
 (6) $C_8-C_{15}$ cycloalkylalkyl,
 each of which may be optionally ring-substituted with
  (a) hydroxy,
  (b) $C_1-C_3$ alkyl, or
  (c) $C_1-C_3$ alkoxy;
(B) a diamine having the formula $$Q^3-\underset{\underset{H}{\|}}{\overset{\overset{NH_2}{\|}}{C}}-(CH_2)_n-\underset{\underset{H}{\|}}{\overset{\overset{NH_2}{\|}}{C}}-Q^3,$$

wherein $n$ represents 0 to 4; each $Q^3$ independently represents
 (1) hydrogen, or
 (2) $C_1-C_3$ alkyl, optionally substituted with
  (a) hydroxy;
(C) a quaternary salt having the formula $$\underset{\underset{Q^4}{\diagdown}\overset{Q^4}{\diagup}}{Q^4-\overset{+}{N}-Q^4} \quad X^-,$$

wherein each $Q^4$ independently represents
 (1) hydrogen, or
 (2) $C_1-C_3$ alkyl,
and X represents
 (1) hydroxy,
 (2) ½$CO_3^=$, or
 (3) acetate;
(D) lecithin;
(E) an alkali metal hydroxide;
(F) calcium hydroxide;
(G) magnesium hydroxide; or
(H) an alkali metal salt of an acid chosen from the group consisting of formic acid, benzoic acid, acetic acid, ethylenediamine tetraacetic acid, nitrilotriacetic acid, propionic acid, citric acid, butyric acid, and carbonic acid, said components (I) and (II) being selected to function cooperatively to inhibit the isomerization of trans-diethylstilbestrol.

2. The method of claim 1 in which the inhibition is accomplished in an animal feed premix.

3. The method of claim 1 in which the first component compound is glucose.

4. The method of claim 1 in which the first component compound is vanillin.

5. The method of claim 1 in which the first component compound is citral.

6. The method of claim 1 in which the first component compound is diacetyl.

7. The composition which comprises an animal feed or premix, trans-diethylstilbestrol, and an effective amount of an isomerization-inhibiting mixture comprising (I) a first component chosen from the class consisting of (A) an aldehyde or ketone having one of the formulae

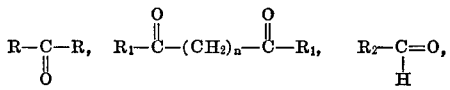

or wherein each R independently represents
(1) carboxy,
(2) $C_1$–$C_{12}$ alkyl,
(3) $C_2$–$C_6$ carboxyalkyl,
(4) $C_1$–$C_3$ haloalkyl,
(5) $C_2$–$C_8$ alkenyl,
(6) benzyl, optionally substituted with
  (a) α-halo,
(7) phenyl, optionally substituted with
  (a) $C_1$–$C_3$ alkyl,
  (b) $C_2$–$C_4$ alkenyl, or
  (c) nitro, or
(8) dihydropyran, optionally substituted with
  (a) $C_1$–$C_3$ alkyl, or
  (b) keto oxygen;
or both R's taken together with the carbon atom to which they are attached form
(1) $C_3$–$C_{15}$ cycloalkyl,
(2) indane,
(3) tetrahydropyran, optionally substituted with
  (a) $C_1$–$C_3$ alkyl,
(4) dihydropyran, optionally substituted with
  (a) $C_1$–$C_3$ alkyl, or
  (b) $C_1$–$C_4$ alkanoyl, or
(5) cycloheptatriene, optionally substituted with
  (a) hydroxy;
$n$ is 0 to 2; each $R_1$ independently represents
(1) hydrogen,
(2) $C_1$–$C_3$ alkyl, or
(3) phenyl;
or both $R_1$'s taken together with the carbon atoms to which they are attached form
(1) indane,
(2) $C_3$–$C_{10}$ cycloalkyl, optionally substituted with
  (a) $C_1$–$C_3$ alkyl, or
(3) dihydropyran, optionally substituted with
  (a) $C_1$–$C_3$ alkyl or
  (b) $C_1$–$C_4$ alkanoyl;
$R_2$ represents
(1) $C_1$–$C_4$ alkanoyl,
(2) $C_6$–$C_{12}$ alkyl,
(3) $C_6$–$C_{12}$ alkenyl,
(4) phenyl, optionally substituted with
  (a) hydroxy,
  (b) nitro, or
  (c) $C_1$–$C_3$ alkoxy, or
(5) tetrahydrofuran, optionally substituted with
  (a) $C_1$–$C_3$ alkyl;
or (B) an aldehydic reducing sugar containing 5–12 carbon atoms; and (II) a second component selected from the class of bases consisting of (A) an amine having one of the formulae

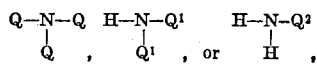

wherein each Q independently represents
(1) hydrogen,
(2) allyl,
(3) propargyl,
(4) $C_1$–$C_3$ alkyl, optionally substituted with
  (a) hydroxy, or
(5) benzyl, optionally substituted with
  (a) $C_1$–$C_3$ alkyl,
  (b) $C_1$–$C_3$ alkoxy, or
  (c) hydroxy;
each $Q^1$ independently represents
(1) $C_4$–$C_8$ alkyl,
(2) $C_4$–$C_8$ alkenyl,
(3) $C_4$–$C_8$ alkynyl,
(4) $C_3$–$C_8$ cycloalkyl, or
(5) $C_4$–$C_7$ cycloalkylalkyl, each of which may be optionally substituted with
  (a) hydroxy;
or both $Q^1$'s taken together with the nitrogen atom to which they are attached represent
(1) pyrrolidinyl,
(2) piperidinyl, or
(3) morpholinyl;
$Q^2$ represents
(1) $C_9$–$C_{18}$ alkyl,
(2) $C_9$–$C_{19}$ alkenyl, or
(3) $C_9$–$C_{18}$ alkynyl, each of which may be optionally substituted with
  (a) hydroxy;
(4) $C_7$–$C_9$ phenylalkyl,
(5) $C_9$–$C_{15}$ cycloalkyl, or
(6) $C_8$–$C_{15}$ cycloalkylalkyl, each of which may be optionally ring-substituted with
  (a) hydroxy,
  (b) $C_1$–$C_3$ alkyl, or
  (c) $C_1$–$C_3$ alkoxy;
(B) a diamine having the formula

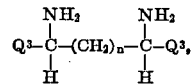

wherein $n$ represents 0 to 4; each $Q^3$ independently represents
(1) hydrogen, or
(2) $C_1$–$C_3$ alkyl, optionally substituted with
  (a) hydroxy;
(C) a quaternary salt having the formula

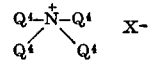

wherein each $Q^4$ independently represents
(1) hydrogen, or
(2) $C_1$–$C_3$ alkyl,
and X represents
(1) hydroxy,
(2) ½ $CO_3^=$, or
(3) acetate;
(D) lecithin;
(E) an alkali metal hydroxide;
(F) calcium hydroxide;
(G) magnesium hydroxide; or
(H) an alkali metal salt of an acid chosen from the group consisting of formic acid, benzoic acid, acetic acid, ethylenediamine tetraacetic acid, nitrotriacetic acid, propionic acid, citric acid, butyric acid, and carbonic acid, said Components (I) and (II) being selected to function cooperatively to inhibit the isomerization of trans-di-ethylstilbestrol.

8. The composition of claim 7 which is an animal feed premix.

9. The composition of claim 7 in which the first component compound is glucose.

10. The composition of claim 7 in which the first component compound is vanillin.

11. The composition of claim 7 in which the first component compound is citral.

12. The composition of claim 7 in which the first component compound is diacetyl.

13. The composition which comprises trans-diethylstilbestrol and an effective amount of an isomerization-inhibiting mixture comprising (I) a first component chosen from the class consisting of (A) an aldehyde or ketone having one of the formulae

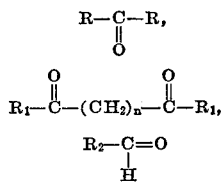

or wherein each R independently represents
   (1) carboxy,
   (2) $C_1-C_{12}$ alkyl,
   (3) $C_2-C_6$ carboxyalkyl,
   (4) $C_1-C_3$ haloalkyl,
   (5) $C_2-C_6$ alkenyl,
   (6) benzyl, optionally substituted with
      (a) α-halo,
   (7) phenyl, optionally substituted with
      (a) $C_1-C_3$ alkyl,
      (b) $C_2-C_4$ alkenyl, or
      (c) nitro, or
   (8) dihydropyran, optionally substituted with
      (a) $C_1-C_3$ alkyl, or
      (b) keto oxygen;
or both R's taken together with the carbon atom to which they are attached form
   (1) $C_3-C_{15}$ cycloalkyl,
   (2) indane,
   (3) tetrahydropyran, optionally substituted with
      (a) $C_1-C_3$ alkyl,
   (4) dihydropyran, optionally substituted with
      (a) $C_1-C_3$ alkyl, or
      (b) $C_1-C_4$ alkanoyl, or
   (5) cycloheptatriene, optionally substituted with
      (a) hydroxy;
$n$ is 0 to 2; each $R_1$ independently represents
   (1) hydrogen,
   (2) $C_1-C_3$ alkyl, or
   (3) phenyl;
or both $R_1$'s taken together with the carbon atoms to which they are attached form
   (1) indane,
   (2) $C_3-C_{10}$ cycloalkyl, optionally substituted with
      (a) $S_1-C_3$ alkyl, or
   (3) dihydropyran, optionally substituted with
      (a) $C_1-C_3$ alkyl or
      (b) $C_1-C_4$ alkanoyl;
$R_2$ represents
   (1) $C_1-C_4$ alkanoyl,
   (2) $C_6-C_{12}$ alkyl,
   (3) $C_6-C_{12}$ alkenyl,
   (4) phenyl, optionally substituted with
      (a) hydroxy,
      (b) nitro, or
      (c) $C_1-C_3$ alkoxy, or
   (5) tetrahydrofuran, optionally substituted with
      (a) $C_1-C_3$ alkyl;
or (B) an aldehydic reducing sugar containing 5-12 carbon atoms; and (II) a second component selected from the class of bases consisting of (A) an amine having one of the formulae

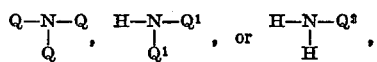

wherein each Q independently represents
   (1) hydrogen,
   (2) allyl,
   (3) propargyl,
   (4) $C_1-C_3$ alkyl, optionally substituted with
      (a) hydroxy, or
   (5) benzyl, optionally substituted with
      (a) $C_1-C_3$ alkyl,
      (b) $C_1-C_3$ alkoxy, or
      (c) hydroxy;
each $Q^1$ independently represents
   (1) $C_4-C_8$ alkyl,
   (2) $C_4-C_8$ alkenyl,
   (3) $C_4-C_8$ alkynyl,
   (4) $C_3-C_8$ cycloalkyl, or
   (5) $C_4-C_7$ cycloalkylalkyl,
      each of which may be optionally substituted with
         (a) hydroxy;
or both $Q^1$'s taken together with the nitrogen atom to which they are attached represent
   (1) pyrrolidinyl,
   (2) piperidinyl, or
   (3) morpholinyl;
$Q^2$ represents
   (1) $C_9-C_{18}$ alkyl,
   (2) $C_9-C_{18}$ alkenyl, or
   (3) $C_9-C_{18}$ alkynyl,
      each of which may be optionally substituted with
         (a) hydroxy;
   (4) $C_7-C_9$ phenylalkyl,
   (5) $C_9-C_{15}$ cycloalkyl, or
   (6) $C_8-C_{15}$ cycloalkylalkyl,
      each of which may be optionally ring-substituted with
         (a) hydroxy,
         (b) $C_1-C_3$ alkyl, or
         (c) $C_1-C_3$ alkoxy;
(B) a diamine having the formula

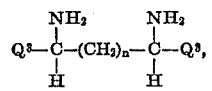

wherein $n$ represents 0 to 4; each $Q^3$ independently represents
   (1) hydrogen, or
   (2) $C_1-C_3$ alkyl, optionally substituted with
      (a) hydroxy;
(C) a quaternary salt having the formula

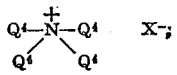

wherein each $Q^4$ independently represents
   (1) hydrogen, or
   (2) $C_1-C_3$ alkyl,
and X represents
   (1) hydroxy,
   (2) ½$CO_3^=$, or
   (3) acetate;
(D) lecithin;
(E) an alkali metal hydroxide;
(F) calcium hydroxide;
(G) magnesium hydroxide; or
(H) an alkali metal salt of an acid chosen from the group consisting of formic acid, benzoic acid, acetic acid, ethylene diamine tetraacetic acid, nitrilotriacetic acid, propionic acid, citric acid, butyric acid, and carbonic acid, said components (I) and (II) being selected to function cooperatively to inhibit the isomerization of trans-di-ethylstilbesterol.

References Cited
UNITED STATES PATENTS
3,716,645   2/1973   Boehme et al. _____ 424—346

SAM ROSEN, Primary Examiner